United States Patent
Mishra et al.

(10) Patent No.: US 8,135,985 B2
(45) Date of Patent: Mar. 13, 2012

(54) HIGH AVAILABILITY SUPPORT FOR VIRTUAL MACHINES

(75) Inventors: Rajeev Mishra, Karnataka (IN); Lance Warren Russell, Rosanky, TX (US); Ravi A. Shankar, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 12/486,332

(22) Filed: Jun. 17, 2009

(65) Prior Publication Data

US 2010/0325471 A1    Dec. 23, 2010

(51) Int. Cl.
 *G06F 11/00* (2006.01)
(52) U.S. Cl. .............................. 714/13; 718/1
(58) Field of Classification Search .......... 714/13, 714/15, 20, 36; 718/1
See application file for complete search history.

(56) References Cited

U.S. PATENT DOCUMENTS

| | | | | |
|---|---|---|---|---|
| 5,260,945 A * | 11/1993 | Rodeheffer | | 714/4.5 |
| 6,038,677 A | 3/2000 | Lawlor et al. | | |
| 6,209,018 B1 * | 3/2001 | Ben-Shachar et al. | | 718/105 |
| 6,453,430 B1 * | 9/2002 | Singh et al. | | 714/47.3 |
| 6,691,250 B1 * | 2/2004 | Chandiramani et al. | | 714/25 |
| 6,941,555 B2 | 9/2005 | Jacobs et al. | | |
| 7,213,246 B1 * | 5/2007 | van Rietschote et al. | | 718/1 |
| 7,243,267 B2 * | 7/2007 | Klemm et al. | | 714/38 |
| 7,246,200 B1 | 7/2007 | van Rietschote et al. | | |
| 7,392,403 B1 | 6/2008 | Munetoh | | |
| 7,409,577 B2 | 8/2008 | Wing et al. | | |
| 7,797,587 B2 * | 9/2010 | Vasudevan et al. | | 714/47 |
| 7,849,367 B2 * | 12/2010 | Srivastava et al. | | 714/47.1 |
| 7,865,679 B2 * | 1/2011 | Sartore | | 711/162 |
| 8,006,079 B2 * | 8/2011 | Goodson et al. | | 713/1 |
| 2003/0167421 A1 * | 9/2003 | Klemm | | 714/37 |
| 2004/0172574 A1 * | 9/2004 | Wing et al. | | 714/4 |
| 2007/0094659 A1 * | 4/2007 | Singh et al. | | 718/1 |
| 2008/0059556 A1 * | 3/2008 | Greenspan et al. | | 709/201 |
| 2009/0007105 A1 * | 1/2009 | Fries et al. | | 718/1 |
| 2010/0107158 A1 * | 4/2010 | Chen et al. | | 718/1 |

* cited by examiner

*Primary Examiner* — Robert Beausoliel, Jr.
*Assistant Examiner* — Elmira Mehrmanesh
(74) *Attorney, Agent, or Firm* — Yee & Associates, P.C.; David A. Mims, Jr.

(57) ABSTRACT

A computer implemented method, a tangible computer storage medium, and a data processing system provide high availability support for virtual machines in a logical partitioned platform. A monitoring system detect a failure in the virtual machine. Partition management firmware then restarts the virtual machine in a consistency failover image node utilizing a consistency failover image. If a subsequent failure of the virtual machine is detected within a predetermined time, partition management firmware restarts the virtual machine in a boot failover image node utilizing a boot failover image.

21 Claims, 4 Drawing Sheets

HIGH AVAILABILITY SUPPORT FOR VIRTUAL MACHINES

BACKGROUND

1. Field

The disclosure relates generally to a computer implemented method, a tangible computer storage medium, and a data processing system. More specifically, the disclosure relates to a computer implemented method, a tangible computer storage medium, and a data processing system for providing high availability support for virtual machines.

2. Description of Related Art

Increasingly large symmetric multi-processor data processing systems are not being used as single large data processing systems. Instead, these types of data processing systems are being partitioned and used as smaller systems. These systems are also referred to as logical partitioned (LPAR) data processing systems. A logical partitioned functionality within a data processing system allows multiple copies of a single operating system or multiple heterogeneous operating systems to be simultaneously run on a single data processing system platform. A partition, within which an operating system image runs, is assigned a non-overlapping subset of the platforms resources. These platform allocable resources include one or more architecturally distinct processors and their interrupt management area, regions of system memory, and input/output (I/O) adapter bus slots. The partition's resources are represented by the platform's firmware to the operating system image.

Each distinct operating system or image of an operating system running within a platform is protected from each other, such that software errors on one logical partition cannot affect the correct operation of any of the other partitions. This protection is provided by allocating a disjointed set of platform resources to be directly managed by each operating system image and by providing mechanisms for ensuring that the various images cannot control any resources that have not been allocated to that image. Furthermore, software errors in the control of an operating system's allocated resources are prevented from affecting the resources of any other image. Thus, each image of the operating system or each different operating system directly controls a distinct set of allocable resources within the platform.

With respect to hardware resources in a logical partitioned data processing system, these resources are shared dis-jointly among various partitions. These resources may include, for example, input/output (I/O) adapters, memory DIMMs, non-volatile random access memory (NVRAM), and hard disk drives. Each partition within a logical partitioned data processing system may be booted and shut down over and over without having to power-cycle the entire data processing system.

SUMMARY

According to one embodiment, a computer implemented method, a tangible computer storage medium, and a data processing system provide high availability support for virtual machines in a logical partitioned platform. A monitoring system detects a failure in the virtual machine. Partition management firmware then restarts the virtual machine in a consistency failover image node utilizing a consistency failover image. If a subsequent failure of the virtual machine is detected within a predetermined time, partition management firmware restarts the virtual machine in a boot failover image node utilizing a boot failover image.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
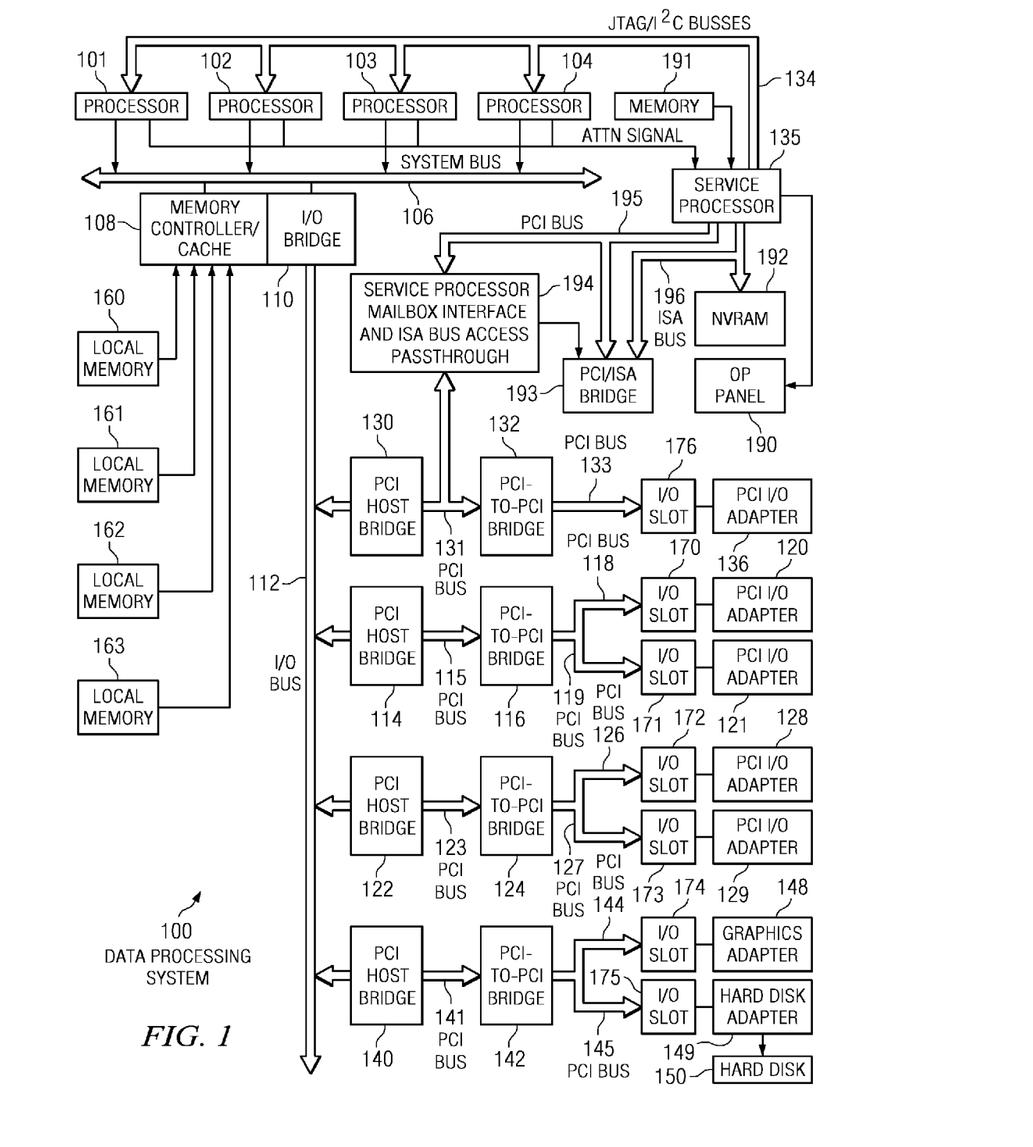
FIG. 1 is a block diagram of a data processing system in which illustrative embodiments may be implemented.

With reference now to the figures, and in particular with reference to FIG. 1, a block diagram of a data processing system in which illustrative embodiments may be implemented is depicted. Data processing system 100 may be a symmetric multiprocessor (SMP) system including processors 101, 102, 103, and 104, which connect to system bus 106. For example, data processing system 100 may be an IBM eServer, a product of International Business Machines Corporation in Armonk, N.Y., implemented as a server within a network. Alternatively, a single processor system may be employed. Also connected to system bus 106 is memory controller/cache 108, which provides an interface to local memories 160, 161, 162, and 163. I/O bridge 110 connects to system bus 106 and provides an interface to I/O bus 112. Memory controller/cache 108 and 110 bridge 110 may be integrated as depicted.

Data processing system 100 is a logical partitioned (LPAR) data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120, 121, 128, 129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120, 121, 128, 129, and 136, graphics adapter 148, hard disk adapter 149, each of host processors 101, 102, 103, and 104, and memory from local memories 160, 161, 162, and 163 is assigned to each of the three partitions. In these examples, memories 160, 161, 162, and 163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160, 161, 162, and 163, and 110 adapters 120, 128, and 129 may be assigned to logical partition P1; processors 102 and 103, some portion of memory from local memories 160, 161, 162, and 163, and PCI I/O adapters 121 and 136 may be assigned to partition P2; and processor 104, some portion of memory from local memories 160, 161, 162, and 163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 114 connected to I/O bus 112 provides an interface to PCI local bus 115. PCI I/O adapters 120 and 121 connect to PCI bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI bus 123. PCI bus 123 connects to a plurality of PCI I/O adapters 128 and 129. PCI I/O adapters 128 and 129 connect to PCI bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

A memory mapped graphics adapter 148 is inserted into I/O slot 174 and connects to I/O bus 112 through PCI bus 144, PCI-to-PCI bridge 142, PCI bus 141, and PCI host bridge 140. Hard disk adapter 149 may be placed into I/O slot 175, which connects to PCI bus 145. In turn, this bus connects to PCI-to-PCI bridge 142, which connects to PCI host bridge 140 by PCI bus 141.

A PCI host bridge 130 provides an interface for PCI bus 131 to connect to I/O bus 112. PCI I/O adapter 136 connects to I/O slot 176, which connects to PCI-to-PCI bridge 132 by PCI bus 133. PCI-to-PCI bridge 132 connects to PCI bus 131. This PCI bus also connects PCI host bridge 130 to the service processor mailbox interface and ISA bus access pass-through 194 and PCI-to-PCI bridge 132. Service processor mailbox interface and ISA bus access pass-through 194 forwards PCI accesses destined to the PCI/ISA bridge 193. NVRAM storage 192 connects to the ISA bus 196. Service processor 135 connects to service processor mailbox interface and ISA bus access pass-through logic 194 through its local PCI bus 195. Service processor 135 also connects to processors 101, 102, 103, and 104 via a plurality of JTAG/I$^2$C busses 134. JTAG/I$^2$C busses 134 are a combination of JTAG/scan busses (see IEEE 1149.1) and Phillips I$^2$C busses. However, alternatively, JTAG/I$^2$C busses 134 may be replaced by only Phillips I$^2$C busses or only JTAG/scan busses. All SP-ATTN signals of the host processors 101, 102, 103, and 104 connect together to an interrupt input signal of service processor 135. Service processor 135 has its own local memory 191 and has access to the hardware OP-panel 190.

When data processing system 100 is initially powered up, service processor 135 uses the JTAG/I$^2$C busses 134 to interrogate the system (host) processors 101, 102, 103, and 104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101, 102, 103, and 104, memory controller/cache 108, and I/O bridge 110. Any error information for failures detected during the BISTs, BATs, and memory tests are gathered and reported by service processor 135.

If a meaningful and valid configuration of system resources is still possible after taking out the elements found to be faulty during the BISTs, BATs, and memory tests, then data processing system 100 is allowed to proceed to load executable code into local (host) memories 160, 161, 162, and 163. Service processor 135 then releases host processors 101, 102, 103, and 104 for execution of the code loaded into local memory 160, 161, 162, and 163. While host processors 101, 102, 103, and 104 are executing code from respective operating systems within data processing system 100, service processor 135 enters a mode of monitoring and reporting errors. The type of items monitored by service processor 135 include, for example, the cooling fan speed and operation, thermal sensors, power supply regulators, and recoverable and non-recoverable errors reported by processors 101, 102, 103, and 104, local memories 160, 161, 162, and 163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for de-configuration during the current running session and future Initial Program Loads (IPLs). IPLs are also sometimes referred to as a "boot" or "bootstrap".

Data processing system 100 may be implemented using various commercially available computer systems. For example, data processing system 100 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to illustrative embodiments.

Figure 2:
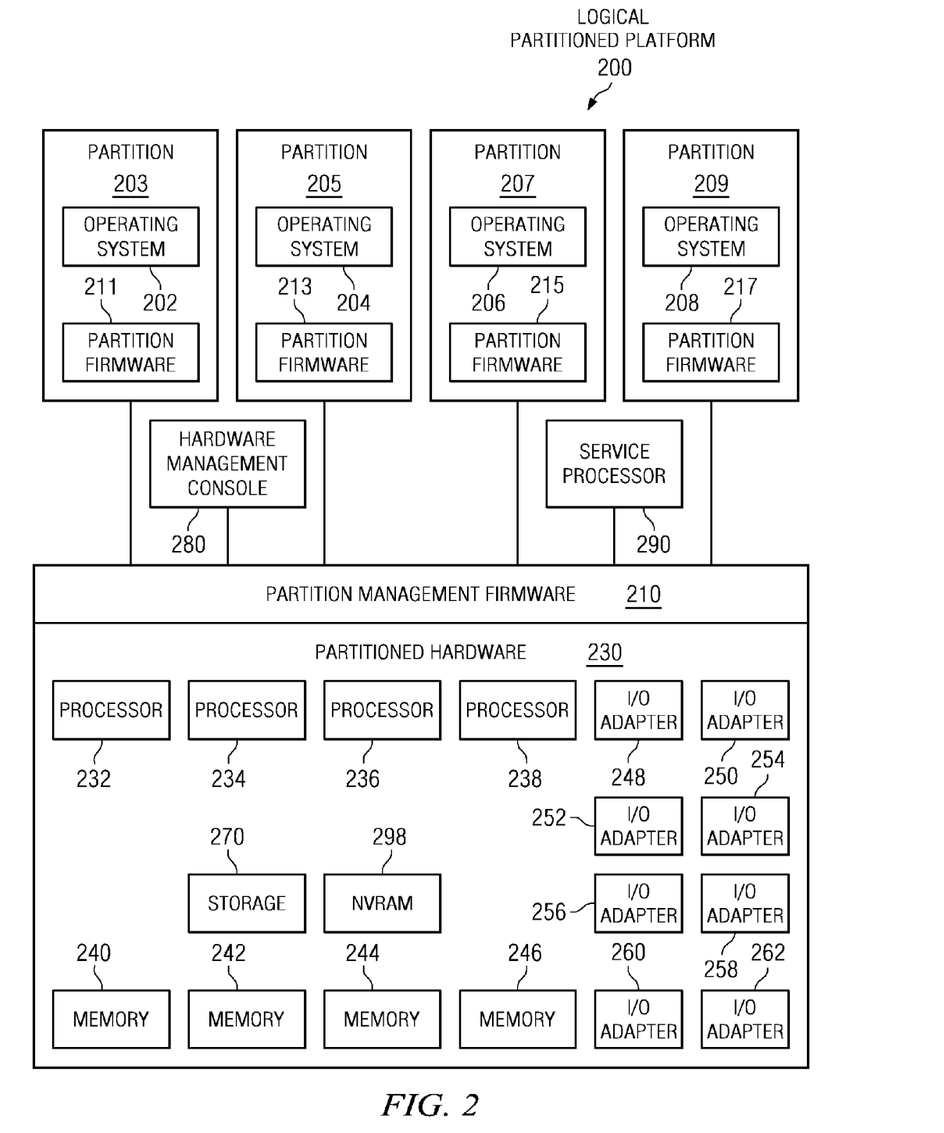
FIG. 2 is a block diagram of an exemplary logical partitioned platform in which illustrative embodiments may be implemented.

With reference now to FIG. 2, a block diagram of an exemplary logical partitioned platform is depicted in which illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and partition management firmware 210. Operating systems 202, 204, 206, and 208 may be multiple copies of a single operating system or multiple heterogeneous operating systems simultaneously run on logical partitioned platform 200. These operating systems may be implemented using OS/400, which are designed to interface with a partition management firmware, such as Hypervisor, which is available from International Business Machines Corporation. OS/400 is used only as an example in these illustrative embodiments. Of course, other types of operating systems, such as AIX and Linux, may be used depending on the particular implementation. Operating systems 202, 204, 206, and 208 are located in partitions 203, 205, 207, and 209. Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Additionally, these partitions also include partition firmware 211, 213, 215, and 217. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, a copy of boot strap code is loaded onto partitions 203, 205, 207, and 209 by platform firmware 210. Thereafter, control is transferred to the boot strap code with the boot strap code then loading the open firmware and RTAS. The processors associated or assigned to the partitions are then dispatched to the partition's memory to execute the partition firmware.

Partitioned hardware 230 includes processors 232, 234, 236, and 238, memories 240, 242, 244, and 246, input/output (I/O) adapters 248, 250, 252, 254, 256, 258, 260, and 262, and a storage unit 270. Each of processors 232, 234, 236, and 238, memories 240, 242, 244, and 246, NVRAM storage 298, and I/O adapters 248, 250, 252, 254, 256, 258, 260, and 262 may be assigned to one of multiple partitions within logical partitioned platform 200, each of which corresponds to one of operating systems 202, 204, 206, and 208.

Partition management firmware 210 performs a number of functions and services for partitions 203, 205, 207, and 209 to create and enforce the partitioning of logical partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing all the hardware resources of logical partitioned platform 200.

Service processor 290 may be used to provide various services, such as processing of platform errors in the partitions. These services also may act as a service agent to report errors back to a vendor, such as International Business Machines Corporation. Operations of the different partitions may be controlled through a hardware management console, such as hardware management console 280. Hardware management console 280 is a separate data processing system from which a system administrator may perform various functions including reallocation of resources to different partitions.

The illustrative embodiments herein describe a computer implemented method, a tangible computer storage medium, and a data processing system that provide high availability failover support for virtual machines in a logical partitioned platform. A monitoring system detects a failure in the virtual machine. Partition management firmware then restarts the virtual machine in a consistency failover image node utilizing a consistency failover image. If a subsequent failure of the virtual machine is detected within a predetermined time, partition management firmware restarts the virtual machine in a boot failover image node utilizing a boot failover image.

Figure 3:
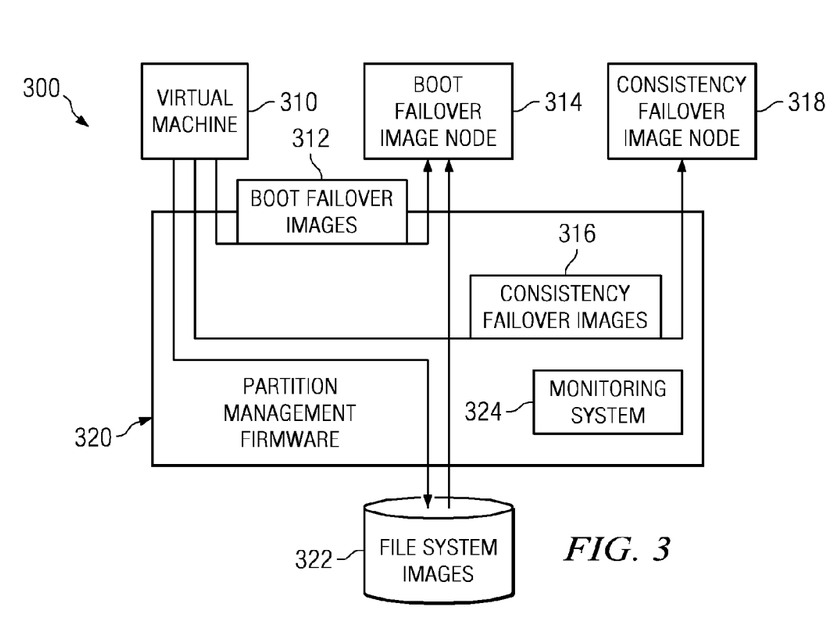
FIG. 3 is a dataflow diagram for providing high availability support for virtual machines according to an illustrative embodiment.

Referring now to FIG. 3, a dataflow diagram is shown for providing high availability support for virtual machines according to an illustrative embodiment. Logical partitioned platform 300 is a logical partitioned platform, such as logical partitioned platform 200 of FIG. 2.

Virtual Machine 310 is an allocation of resources within an underlying physical machine to allow multiple partitions to execute as if they were separate physical systems. Virtual machine 310 is one such partition, running its own operating system. Virtual machine 310 is implemented in a partition of a logical partitioned platform, such as one of partitions 203, 205, 207, and 209 of FIG. 2.

When virtual machine 310 is initially started, boot failover image 312 is created. Boot failover image 312 is constructed at the last point in the virtual machine boot process before changeable files are opened. Boot failover image 312 is a file containing the contents and structure representing virtual machine 310 at the time of startup. Boot failover image 312 allows other virtual machines similar to virtual machine 310 to boot when boot failover image 312 is utilized in starting those other virtual machines. Boot failover image 312 is utilized to automatically switch over to a redundant other virtual machine in the event of failure within the virtual machine 310.

In one illustrate embodiment, the redundant other virtual machine is implemented on the same partitioned system as virtual machine 310. In one illustrate embodiment, the redundant other virtual machine is implemented on a different partitioned system than logical partitioned platform 300.

Boot failover image 312 is moved to storage that can be accessed by the boot failover image node 314. Boot failover image node 314 is implemented in a partition, such as one of partitions 203, 205, 207, and 209 of FIG. 2. Boot failover image node 314 remains unstarted; it is not an active virtual machine. Boot failover image node 314 is a backup redundant copy of virtual machine 310. This copy is restarted in the event that a software failure within virtual machine 310 is assumed.

While boot failover image node 314 is shown as a node within logical partitioned platform 300, such an embodiment is shown for ease of explanation only, and is only one illustrative embodiment. In one illustrative embodiment, boot failover image node 314 is implemented on a different partitioned system than logical partitioned platform 300.

As virtual machine 310 is running, fine-grained images are continuously and periodically constructed. These fine-grained images are snapshots of both a file system image of virtual machine 310 and a memory image of virtual machine 310. The fine-grained images can be utilized to restart virtual machine 310 in a state identical to the present state when fine-grained image is recorded. In one illustrative embodiment, the fine-grained image records only changes to the file system and memory of virtual machine 310 that have occurred since the previous fine-grained image was recorded. The fine-grained images therefore do not necessarily capture a complete image of the file system and memory.

At the same time as the construction of the fine-grained images, corresponding consistency images are constructed for storage, networking, and memory. Together, the fine-grained images and the consistency images comprise consistency failover images 316.

Consistency failover images 316 are continuously and periodically constructed during the time period in which virtual machine 310 is operational. Consistency failover images 316 are files containing the contents and structure, including the fine-grained images, representing virtual machine 310 at the time at which the image is created. Consistency failover images 316 allows other virtual machines identical to virtual machine 310 to continue uninterrupted operation of the virtual machine 310 when consistency failover images 316 is utilized in starting those other virtual machines. Consistency failover images 316 is utilized to automatically switch over to a redundant other virtual machine in the event of failure within virtual machine 310.

As consistency failover images 316 are periodically created, consistency failover images 316 are moved to storage that can be accessed by the consistency failover image node 318. Consistency failover image node 318 is implemented in a partition, such as one of partitions 203, 205, 207, and 209 of FIG. 2. Consistency failover image node 318 remains unstarted; it is not an active virtual machine. Consistency failover image node 318 is a backup redundant copy of virtual machine 310 that is restarted in the event that a failure within virtual machine 310 is detected.

While consistency failover image node 318 is shown as a node within logical partitioned platform 300, such an embodiment is shown for ease of explanation only, and is only one illustrative embodiment. In one illustrative embodiment, consistency failover image node 318 is implemented on a different partitioned system than logical partitioned platform 300.

Movement of both the boot failover image 312 and the consistency failover images 316 may be controlled by software or firmware, such as for example, but not limited to, partition management firmware 320. Partition management firmware 320 is a partition management firmware, such as for example, but not limited to, partition management firmware 210 of FIG. 2.

File system images 322 are images taken of the file system. File system images 322 are files containing the contents and structure of a file system utilized by the virtual machine, taken at various times during the operation of the virtual machine 310. Typically, file system images 322 are taken when there is a change to one of the underlying files of the file system. By maintaining file system images 322, logical partitioned platform 300 can maintain the integrity of the file system in the event of a failure of virtual machine 310.

Monitoring system 324 detects failures of virtual machine 310. Monitoring system 324 can be, for example but not limited to network monitoring systems, or firm ware monitoring systems of the virtual machine. Monitoring system 324 can also be a set of monitors installed within the operating system of virtual machine 310 that detect catastrophic failures.

Figure 4:
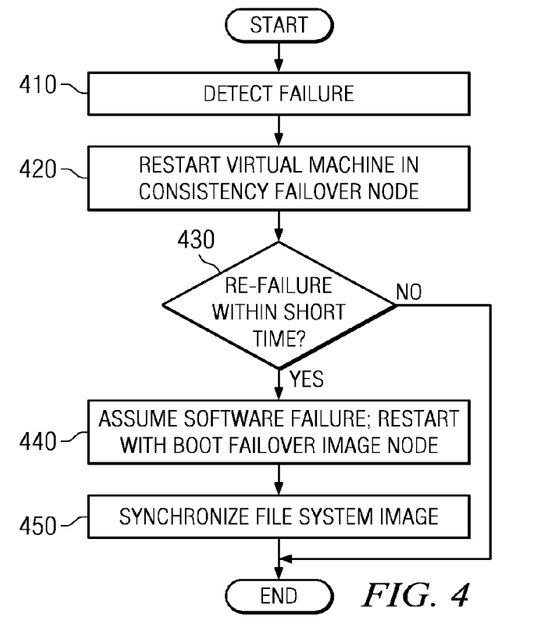
FIG. 4 is a flowchart for providing high availability failover for virtual machines according to an illustrative embodiment.

Referring now to FIG. 4, a flowchart for providing high availability failover for virtual machines is shown according to an illustrative embodiment. Process 400 is a software process, executing on a software component, such as partition management firmware 320 of FIG. 3.

Process 400 begins by detecting a failure of the virtual machine (step 410). The virtual machine is a virtual machine such as virtual machine 310 of FIG. 3. The failure can be either a software failure or a hardware failure. The failure can be detected by known procedures such as monitoring systems comprising network monitoring or firmware monitoring of the virtual machine. Monitors installed within the operating system that detect catastrophic failures can also be utilized to detect a failure of the virtual machine.

Responsive to detecting the failure, process 400 restarts the virtual machine in the consistency failover image node, using the latest consistency failover image (step 420). As a first failover attempt, process 400 assumes that the failure is a hardware failure. The virtual machine is restarted in a different node having different hardware assigned to that node therefore seamlessly continues operation of the allocated virtual machine. Because the failure is assumed to be a hardware failure, the latest consistency failover image can be utilized to resume operations of the virtual machine without regard for software failures that may be embedded in the latest consistency failover image.

Process 400 then identifies whether an additional failure is detected within a short time after restarting the virtual machine in the consistency failover image node (step 430). In response to not detecting an additional failure within a short time after restarting the virtual machine ("yes" at step 430), process 400 terminates.

Returning now to step 430, if an additional failure is quickly experienced, typically within a time of 100 milliseconds or less, the original assumption that the failure was a hardware failure is likely incorrect. In response to detecting an additional failure within a short time after restarting the virtual machine ("yes" at step 430), process 400 restarts the virtual machine in the boot failover image node, using the boot failover image (step 440). As a second failover attempt, process 400 assumes that the failure is a software failure. Because the failure is now assumed to be a software failure, the failure producing code is assumed to be embedded in the consistency failover images. Therefore, if the virtual machine is restarted using a consistency failover image, the machine will fail again quickly after restart.

The node is therefore restarted in the boot failure image node utilizing the boot failover image created at the initial startup of the virtual machine. The boot failover image does not contain the software errors that caused the failure. Restarting from the boot failure image is much faster than completely rebooting the virtual machine. Because the virtual machine software is restarting from a boot image, recovery routines are invoked immediately.

Process 400 then synchronizes the file system image of the restarted virtual machine (step 450), with the process terminating thereafter. Upon restarting of the virtual machine in the boot failover image node, a file system image, such as one of file system images 322 of FIG. 3, is loaded into the boot failover image node. The restarted virtual machine will therefore maintain the same file system image that was held by the virtual machine prior to the software failure. Recovery routines, such as but not limited to a file system log processing can then be invoked to synchronize the virtual machine by bring the software to a consistent point.

Figure 5:
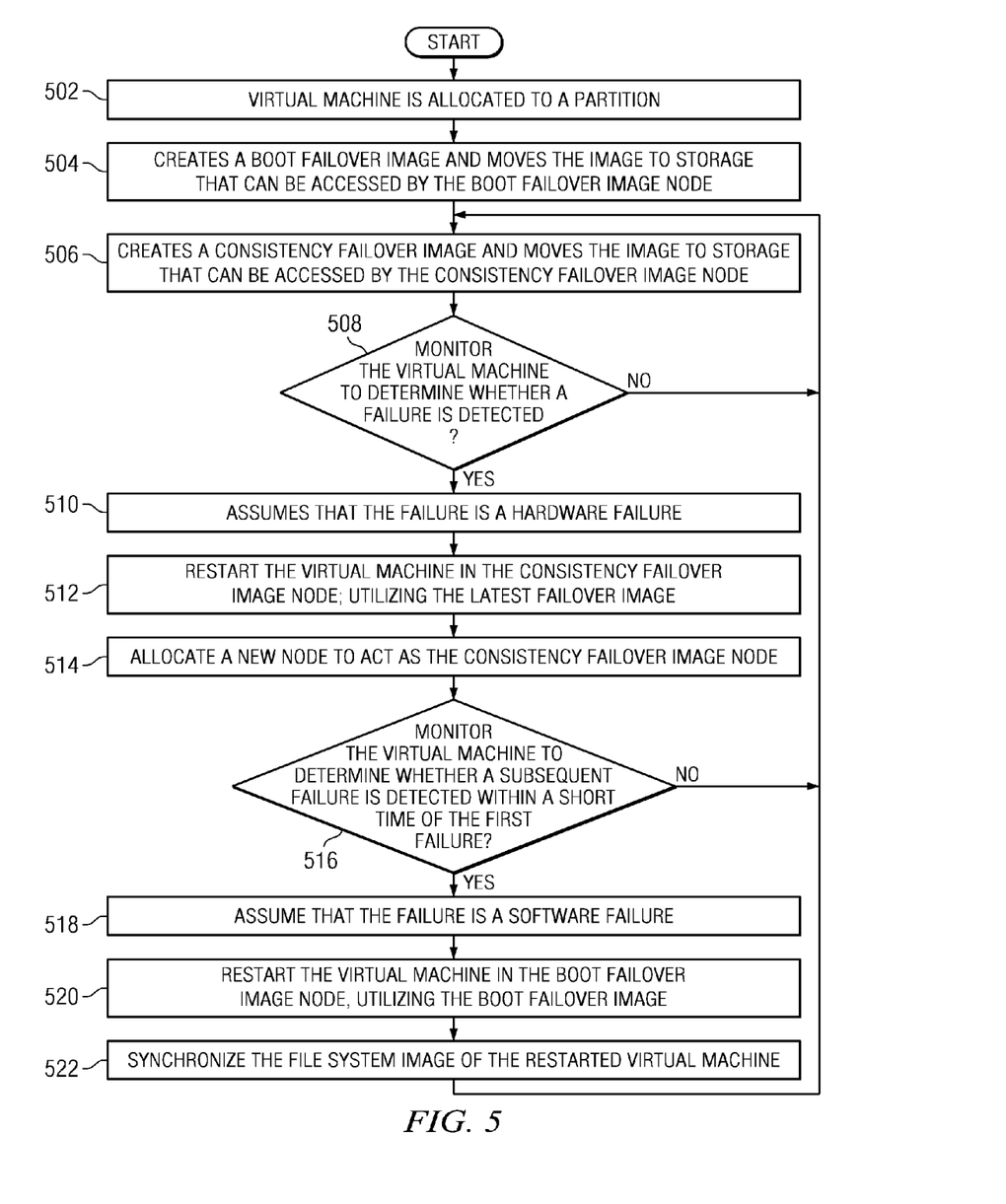
FIG. 5 is a detailed flowchart for providing high availability failover for virtual machines according to an illustrative embodiment.

Referring now to FIG. 5, a detailed flowchart for providing high availability failover for virtual machines is shown according to an illustrative embodiment. Process 500 is a software process, executing on a software component, such as partition management firmware 320 of FIG. 3. Process 500 is a more detailed flowchart of the process shown in FIG. 4.

Process 500 begins when a virtual machine is allocated to a partition (step 502). Process 500 then creates a boot failover image and moves the image to storage that can be accessed by the boot failover image node (step 504). The boot failover image can be boot failover image 312 of FIG. 3. The boot failover image node can be boot failover image node 314 of FIG. 3. The boot failover image is constructed at the last point in the virtual machine boot process before changeable files are opened. The boot failover image is a file containing the contents and structure representing the virtual machine at the time of startup.

In one illustrative embodiment, the boot failover image node may be plural, that is, there may be multiple node candidates for the boot failover image node. When multiple node candidates are available, an "optimal" node one at the point of failure can be selected. The "optimal" node may be defined as, for example, but not limited to, a node within a "logical partition platform" with the lightest load.

Process 500 then creates a consistency failover image and moves the image to storage that can be accessed by the consistency failover image node (step 506). The consistency failover image can be boot failover image 316 of FIG. 3. The consistency failover image node can be consistency failover image node 318 of FIG. 3. The consistency failover image is a file containing the contents and structure representing the virtual machine at the time at which the consistency failover image is created.

In one illustrative embodiment, the consistency failover image node may be plural, that is, there may be multiple node candidates for the consistency failover image node. When multiple node candidates are available, an "optimal" node one at the point of failure can be selected. The "optimal" node may be defined as, for example, but not limited to, a node within a "logical partition platform" with the lightest load.

Process 500 monitors the virtual machine to determine whether a failure is detected (step 508). If a failure is not detected ("no" at step 508), process 500 iterates back to step 506. Another consistency failover image is created and that image is moved to storage that can be accessed by the consistency failover image node.

Returning now to step 508, if a failure is detected ("yes" at step 508), process 500 assumes that the failure is a hardware failure (step 510). Because the failure is assumed to be a hardware failure, the latest consistency failover image can be utilized to resume operations of the virtual machine without regard for software failures that may be embedded in the latest consistency failover image. Process 500 therefore restarts the virtual machine in the selected consistency failover image node, utilizing the latest consistency failover image (step 512). The consistency failover image node is assigned different hardware than the node of the original virtual machine. Therefore, operation of the virtual machine can be seamlessly transitioned to the consistency failover image node.

Process 500 then allocates a new node to act as the consistency failover image node (step 514). Future consistency failover images are written to storage which is accessible to the new consistency failover node.

Process 500 monitors the virtual machine to determine whether a subsequent failure is detected within a short time of the first failure (step 516). If a failure is not detected ("no" at step 516), process 500 iterates back to step 506, and another consistency failover image is created and is moved to storage that can be accessed by the consistency failover image node.

Returning now to step 516, if a subsequent failure is detected within a short time of the first failure ("yes" at step 516), process 500 assumes that the failure is a software failure (step 518). Because the failure is now assumed to be a software failure, the failure producing code is assumed to be embedded in the consistency failover images. Therefore, if the virtual machine is restarted using a consistency failover image, the machine will fail again quickly after restart.

Process 500 therefore restarts the virtual machine in the boot failover image node, utilizing the boot failover image (step 520). The boot failover image does not contain the software errors that caused the failure. Therefore, the boot failover image is utilized in restarting the virtual machine in the boot failover image node.

Process 500 then synchronizes the file system image of the restarted virtual machine (step 522). Upon restarting in the virtual machine in the boot failover image node, a file system image, such as one of file system images 322 of FIG. 3, is loaded into the boot failover image node. The restarted virtual machine will therefore maintain the same file system image that was held by the virtual machine prior to the software failure.

Responsive to synchronizes the file system image, process 500 iterates back to step 502. The original boot failover image node is now utilized to run the virtual machine. In one illustrative embodiment, process 500 therefore allocates a new node to become a new boot failover image node. Process 500 therefore creates a new boot failover image from the new virtual machine and moves the new boot failover image to storage that can be accessed by the new boot failover image node.

In one illustrative embodiment, process 500 copies the original boot failover image directly into the newly allocated boot failover image node. Process 500 then can boot directly from the original boot failover image in the original boot failover image node.

Thus, the illustrative embodiments describe a computer implemented method, a tangible computer storage medium, and a data processing system that provide high availability support for virtual machines in a logical partitioned platform. A monitoring system detects a failure in the virtual machine. Partition management firmware then restarts the virtual machine in a consistency failover image node utilizing a consistency failover image. If a subsequent failure of the virtual machine is detected within a predetermined time, partition management firmware restarts the virtual machine in a boot failover image node utilizing a boot failover image.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for providing failover support for virtual machines in a logical partitioned platform, the method comprising the computer implemented steps of:
   detecting, with a monitoring system, a first failure in a virtual machine in the logical partition platform;
   responsive to detecting the failure in the virtual machine, restarting with a partition management firmware the virtual machine in a consistency failover image node utilizing a consistency failover image; and
   responsive to identifying a subsequent failure of the virtual machine within a predetermined time, restarting with a partition management firmware the virtual machine in a boot failover image node utilizing a boot failover image.

2. The computer implemented method of claim 1, the computer implemented method further comprising:
   responsive to detecting the failure in the virtual machine, restarting the virtual machine in the consistency failover image node utilizing the consistency failover image, wherein the consistency failover image is a first set of files containing contents and structure representing the virtual machine at a time of creation of the consistency failover image; and
   responsive to identifying the subsequent failure of the virtual machine within the predetermined time, restarting the virtual machine in a boot failover image node utilizing the boot failover image, wherein the boot failover image is a second file containing contents and structure representing the virtual machine at a time of startup of the virtual machine.

3. The computer implemented method of claim 2, wherein the consistency failover image is a set of consistency failover images, the computer implemented method further comprising:
   periodically generating one of the set of consistency failover images, wherein each subsequent image of the set of consistency failover images includes changes to a file system of the virtual machine and changes to a memory of the virtual machine, the changes being made since a generation of a previous subsequent image of the set of consistency failover images.

4. The computer implemented method of claim 3, wherein the step of restarting the virtual machine in a consistency failover image node utilizing a consistency failover image further comprises:
   responsive to detecting the failure in the virtual machine, restarting the virtual machine in the consistency failover image node utilizing the set of consistency failover images.

5. The computer implemented method of claim 1, further comprising the computer implemented steps of:
   starting the virtual machine; and
   responsive to starting the virtual machine, generating the boot failover image, wherein the boot failover image is constructed during a virtual machine boot process before any changeable files are opened by the virtual machine.

6. The computer implemented method of claim 1, wherein the computer implemented step of responsive to identifying the subsequent failure of the virtual machine within the predetermined time, restarting the virtual machine in the boot failover image node utilizing the boot failover image further comprises:
   responsive to identifying the subsequent failure of the virtual machine within the predetermined time, restarting the virtual machine in the boot failover image node utilizing the boot failover image, wherein the predetermined time is less than 100 milliseconds.

7. The computer implemented method of claim 1 further comprising the computer implemented steps of:
   invoking a recovery routine to synchronize a file system image of the virtual machine, so that the virtual machine maintains a same file system image that was held by the virtual machine prior to the failure.

8. A tangible computer storage hardware having a computer program product encoded thereon for providing high availability support for virtual machines in a logical partitioned platform, the tangible computer storage hardware comprising:
   instructions for detecting a first failure in a virtual machine;
   instructions, responsive to detecting the failure in the virtual machine, for restarting the virtual machine in a consistency failover image node utilizing a consistency failover image; and
   instructions, responsive to identifying a subsequent failure of the virtual machine within a predetermined time, for restarting the virtual machine in a boot failover image node utilizing a boot failover image.

9. The tangible computer storage hardware of claim 8 further comprising:
   instructions, responsive to detecting the failure in the virtual machine, for restarting the virtual machine in the consistency failover image node utilizing the consistency failover image, wherein the consistency failover image is a first set of files containing contents and structure representing the virtual machine at the time of creation of the consistency failover image; and
   instructions, responsive to identifying the subsequent failure of the virtual machine within the predetermined time, for restarting the virtual machine in a boot failover image node utilizing the boot failover image, wherein the boot failover image is a second file containing contents and structure representing the virtual machine at the time of startup of the virtual machine.

10. The tangible computer storage hardware of claim 9, wherein the consistency failover image is a set of consistency failover images, the tangible computer storage hardware further comprising:

instructions for periodically generating one of the set of consistency failover images, wherein each subsequent image of the set of consistency failover images includes changes to a file system of the virtual machine and changes to a memory of the virtual machine, the changes being made since a generation of a previous subsequent image of the set of consistency failover images.

11. The tangible computer storage hardware of claim 10, wherein the instructions for restarting the virtual machine in a consistency failover image node utilizing a consistency failover image further comprises:

instructions, responsive to detecting the failure in the virtual machine, for restarting the virtual machine in a consistency failover image node utilizing the set of consistency failover images.

12. The tangible computer storage hardware of claim 8, further comprising:

instructions for starting the virtual machine; and
instructions, responsive to starting the virtual machine, for generating the boot failover image, wherein the boot failover image is constructed during a virtual machine boot process before any changeable files are opened by the virtual machine.

13. The tangible computer storage hardware of claim 8, wherein the instructions responsive to identifying a subsequent failure of the virtual machine within the predetermined time, for restarting the virtual machine in the boot failover image node utilizing the boot failover image further comprises:

instructions, responsive to identifying a subsequent failure of the virtual machine within a predetermined time, for restarting the virtual machine in a boot failover image node utilizing a boot failover image, wherein the predetermined time is less than 100 milliseconds.

14. The tangible computer storage hardware of claim 8 further comprising:

instructions for invoking a recovery routine to synchronize a file system image of the virtual machine, so that the virtual machine maintains a same file system image that was held by the virtual machine prior to the failure.

15. A data processing system comprising:

a storage device having computer usable program code encoded thereon for providing high availability support for virtual machines in a logical partitioned platform;
a bus system connecting the storage device to a processor; and
a processor, wherein the processor executes the computer usable program to detect a first failure in a virtual machine; responsive to detecting the failure in the virtual machine, to restart the virtual machine in a consistency failover image node utilizing a consistency failover image; and responsive to identifying a subsequent failure of the virtual machine within a predetermined time, to restart the virtual machine in a boot failover image node utilizing a boot failover image.

16. The data processing system of claim 15, wherein the processor further executes the computer usable program code:

responsive to detecting the failure in the virtual machine, to restart the virtual machine in the consistency failover image node utilizing the consistency failover image, wherein the consistency failover image is a first set of files containing contents and structure representing the virtual machine at a time of creation of the consistency failover image; and responsive to identifying the subsequent failure of the virtual machine within the predetermined time, to restart the virtual machine in a boot failover image node utilizing the boot failover image, wherein the boot failover image is a second file containing contents and structure representing the virtual machine at a time of startup of the virtual machine.

17. The data processing system of claim 16, wherein the consistency failover image is a set of consistency failover images, wherein the processor further executes the computer usable program code:

to periodically generate one of the set of consistency failover images, wherein each subsequent image of the set of consistency failover images includes changes to a file system of the virtual machine and changes to a memory of the virtual machine, the changes being made since a generation of a previous subsequent image of the set of consistency failover images.

18. The data processing system of claim 17, wherein the computer usable program code to restart the virtual machine in a consistency failover image node utilizing a consistency failover image further comprises computer usable program code:

responsive to detecting the failure in the virtual machine, to restart the virtual machine in a consistency failover image node utilizing the set of consistency failover images.

19. The data processing system of claim 15, wherein the processor further executes the computer usable program code:

to start the virtual machine; and
responsive to starting the virtual machine, to generate the boot failover image, wherein the boot failover image is constructed during a virtual machine boot process before any changeable files are opened by the virtual machine.

20. The data processing system of claim 15, wherein the computer usable program code responsive to identifying a subsequent failure of the virtual machine within the predetermined time, to restart the virtual machine in the boot failover image node utilizing the boot failover image further comprises computer usable program code:

responsive to identifying the subsequent failure of the virtual machine within the predetermined time, to restart the virtual machine in the boot failover image node utilizing the boot failover image, wherein the predetermined time is less than 100 milliseconds.

21. The data processing system of claim 15 wherein the processor further executes the computer usable program code:

to invoke a recovery routine to synchronize a file system image of the virtual machine, so that the virtual machine maintains a same file system image that was held by the virtual machine prior to the failure.

* * * * *